(12) United States Patent
Chen et al.

(10) Patent No.: US 7,641,545 B2
(45) Date of Patent: Jan. 5, 2010

(54) VENTILATED WINDOW FOR INDOOR AIR QUALITY IMPROVEMENT IN BUILDINGS

(75) Inventors: Qingyan Chen, Lafayette, IN (US); Jennifer R. Paige, South Grafton, MA (US)

(73) Assignee: Purdue Research Foundation, West Lafayette, IN (US)

( * ) Notice: Subject to any disclaimer, the term of this patent is extended or adjusted under 35 U.S.C. 154(b) by 185 days.

(21) Appl. No.: 11/775,281

(22) Filed: Jul. 10, 2007

(65) Prior Publication Data
US 2008/0032620 A1 Feb. 7, 2008

Related U.S. Application Data

(60) Provisional application No. 60/807,732, filed on Jul. 19, 2006.

(51) Int. Cl.
*F24F 7/013* (2006.01)
*E06B 7/02* (2006.01)
*E06B 7/10* (2006.01)

(52) U.S. Cl. .................. 454/212; 454/185; 454/196; 454/211; 52/209; 126/633

(58) Field of Classification Search .......... 454/185, 454/186, 196, 211, 212; 52/209; 126/633
See application file for complete search history.

(56) References Cited

U.S. PATENT DOCUMENTS

| | | | | | |
|---|---|---|---|---|---|
| 3,925,945 | A | * | 12/1975 | White ................ | 165/48.2 |
| 4,331,066 | A | * | 5/1982 | Schmidlin ........... | 454/212 |
| 4,382,436 | A | * | 5/1983 | Hager ................. | 126/630 |
| 4,505,259 | A | * | 3/1985 | Seppanen et al. ..... | 126/586 |
| 4,577,619 | A | * | 3/1986 | Howe, Jr. ............ | 126/629 |
| 4,641,466 | A | * | 2/1987 | Raninen et al. ...... | 52/171.3 |
| 4,702,157 | A | * | 10/1987 | Comparon ........... | 454/211 |
| 5,732,517 | A | * | 3/1998 | Milikovsky .......... | 52/171.3 |
| 6,178,966 | B1 | * | 1/2001 | Breshears ............ | 126/702 |
| 6,186,886 | B1 | * | 2/2001 | Farrington et al. ... | 454/141 |
| 2005/0076588 | A1 | * | 4/2005 | Sensini ............... | 52/204.6 |
| 2007/0149106 | A1 | * | 6/2007 | Sensini ............... | 454/208 |

FOREIGN PATENT DOCUMENTS

DE 20106814 * 6/2001
EP 27581 A1 * 4/1981

* cited by examiner

*Primary Examiner*—Steven B McAllister
*Assistant Examiner*—Patrick F. O'Reilly, III
(74) *Attorney, Agent, or Firm*—Hartman & Hartman, P.C.; Gary M. Hartman; Domenica N.S. Hartman

(57) ABSTRACT

An airflow window system that includes at least three glazing layers positioned roughly parallel to each other to define at least two internal airflow cavities within the window system. A first of the glazing layers is adjacent a first of the airflow cavities, a second of the glazing layers is adjacent a second of the airflow cavities, and a center glazing layer is between the first and second glazing layers and separates the first and second airflow cavities. Airflow cavity openings are located adjacent the uppermost and lowermost extents of each airflow cavity, and airflow is enabled through the first airflow cavity between the openings thereof and enabled through the second airflow cavity between the openings thereof. The window system operates as a crossflow heat exchanger capable of supplying fresh outdoor air to an enclosed indoor space, while thermally tempering the incoming fresh air with outgoing indoor air.

20 Claims, 9 Drawing Sheets

VENTILATED WINDOW FOR INDOOR AIR QUALITY IMPROVEMENT IN BUILDINGS

CROSS REFERENCE TO RELATED APPLICATIONS

This application claims the benefit of U.S. Provisional Application No. 60/807,732, filed Jul. 19, 2006, the contents of which are incorporated herein by reference.

BACKGROUND OF THE INVENTION

It has been reported that individuals in the USA spend up to about 90% of their time indoors. Because poor indoor air quality has been linked to respiratory illnesses, allergies, asthma and sick building syndrome, adequate ventilation and indoor air quality are important for the health, well-being, productivity and thermal comfort of building occupants. However, heat gains and losses through infiltration and ventilation are believed to account for a significant amount of the energy required to maintain comfortable conditions within buildings. Consequently, in an effort to save energy by reducing shell heat gains and losses, the construction of the building envelope has become increasingly tighter. Increased airtightness of buildings results in less ventilation, with the result that the benefits of lower energy requirements are generally obtained at the expense of adequate indoor air quality.

For commercial buildings, indoor air quality can be regulated by air systems that supply air to the indoor space by mixing fresh outdoor air with return air from the indoor space. In residential buildings, however, outdoor air typically enters the space through doors, operable windows, and infiltration. During the heating and cooling seasons, ventilation is usually limited to infiltration because residential air systems typically use only recirculated air and residential hydronic systems heat air through convection with no direct air exchange. The low ventilation associated with these systems can increase indoor pollutant levels because air pollutants (for example, emissions from indoor sources) are not able to escape the home, and insufficient outdoor air is available to dilute indoor air pollutants.

In view of the above, measures for providing adequate fresh air to residential buildings are being explored, with particular emphasis on achieving improvements in indoor air quality with minimal energy usage. In recent years, integrated sustainable design concepts have been adapted that can improve indoor air quality in buildings while conserving energy. For instance, ventilated building facades are currently being integrated into commercial buildings. However, this technology has not been utilized as frequently in residential buildings because of expense and because multistory facades may not be applicable to residential designs. Another approach is windows having a ventilation capability. An example is an airflow window, which as the name implies differs from a conventional window by the existence of internal airflow, in the form of free or forced convection through an airflow cavity between two layers of glass (glazing). The potential for using airflow windows in residential construction has been explored because they are not as complicated as ventilated facades and have the potential for improving indoor air quality and conserving energy for heating and cooling while also allowing daylight to enter a room.

The airflow cavity of an airflow window is usually combined with a double-glazed insulated unit (two layers of glass spaced apart and hermetically sealed with an air space therebetween), resulting in a triple-paned construction. However, various combinations of single panes or double-glazed insulated units can be used to form an airflow window. Four main modes of operation have been reported for airflow windows: supply, exhaust, indoor air curtain, and outdoor air curtain. These modes are respectively represented in FIGS. 1 through 4, which depict outside air being to the left of each window 100, 200, 300, and 400, respectively, and the inside air being to the right of each window. Typically used during the heating season, the supply air window 100 (FIG. 1) draws air from the outdoor space (e.g., outside) 102 to the indoor space (e.g. a room) 104 through an airflow cavity 106 between an outside glass pane 108 (represented as a single pane) and an inside glass pane 110 (represented as a double-glazed insulated unit). Conversely, during the cooling season, the exhaust air window 200 shown in FIG. 2 exhausts air from the indoor space 204 to the outdoor space 202 through an airflow cavity 206 between an outside glass pane 208 (represented as a double-glazed insulated unit) and an inside glass pane 210 (represented as a single pane). FIGS. 3 and 4 show the indoor and outdoor air curtain windows 300 and 400, respectively, as having airflow cavities 306 and 406 that define airflow paths from inside to inside and outside to outside, respectively. In FIG. 3, the airflow cavity 306 is between an outside glass pane 308 (represented as a double-glazed insulated unit) and an inside glass pane 310 (represented as a single pane), and in FIG. 4 the airflow cavity 406 is between an outside glass pane 408 (represented as a single pane) and an inside glass pane 410 (represented as a double-glazed insulated unit). In all cases, airflow is typically from bottom to top as a result of the configurations making use of the thermal buoyancy effects as air increases in temperature. It has been reported that the exhaust air window 200 may also be used during the heating season with airflow from top to bottom.

In general, the working principle of an airflow window is to entrain the solar heat that has been captured by the airflow window and direct the solar energy indoors or outdoors, depending on the operating mode of the window. Captured solar energy is used to preheat outdoor air in the supply mode of FIG. 1, and reheat indoor air in the indoor air curtain mode of FIG. 3. This working principle is ideal for use during the heating season. For the exhaust and outdoor air curtain modes of FIGS. 2 and 4, airflow is used to remove solar energy by convecting away the excess heat during the cooling season and decreasing conductive heat losses during the heating season. The supply air window 100 can also be used for night cooling.

Airflow through the supply air window 100 is mainly driven by buoyant effects. Solar energy absorbed by the window 100 heats the air inside the airflow cavity 106. The heated air rises, causing the air in the cavity 106 to stratify and move in an upward direction. The strength of the buoyant forces is governed by the vertical temperature differences in the airflow cavity 106, which is influenced by the height of the window 100. In general, the taller the window 100 and/or the greater the temperature difference, the greater the buoyant force. To ensure airflow into the room when buoyant forces are weak, the supply air mode requires that the room 104 in which the window 100 is located be kept at a slightly negative pressure. Airtight construction in the rest of the room 104 is also essential for achieving airflow only through the window 100.

As compared to a conventional window, the exhaust air window 200 can improve thermal comfort conditions by tempering and then exhausting room air between the two glass panes 208 and 210. This is beneficial during both the heating and cooling seasons because the airflow cavity 206 is respectively warmer or cooler. The decrease in temperature difference between an occupant of the room 204 and the surface of the inside glass pane 210 decreases the radiation exchange and improves thermal comfort. The temperature of the airflow cavity 206 also helps to reduce conduction losses through the window 200. Air can be exhausted by natural effects or mechanical effects by positively pressurizing the room 204.

Although the air curtain modes cannot be used to improve indoor air quality or meet ventilation requirements, they offer benefits related to energy consumption and thermal comfort. The outdoor air curtain 400 of FIG. 4 is most beneficial on a sunny day during the cooling season. Warmer outdoor air is driven upward through the airflow cavity 406 because of buoyancy effects. As the air is heated in the cavity 406, it is drawn to and exhausted from the top of the window 400, which in turn causes air to be drawn from the outdoor space 402 into the airflow cavity 406 through an opening at the bottom of the cavity 406. In this way, the daylighting benefits from solar radiation can be enjoyed without overheating the window 400 and subsequently increasing the temperature of the room 404. By helping to prevent overheating in the airflow cavity 406, the temperature difference between the outdoor space 402 and indoor room 404 is minimized, which reduces heat transfer through the window 400 into the room 404 and consequently decreases the amount of energy needed to cool the room 404.

The indoor air curtain window 300 of FIG. 3 works in a similar fashion during the heating season. Solar energy is absorbed by the air within the airflow cavity 306, causing the air to become heated and rise through the cavity 306, and finally convected to the indoor space/room 304 through an opening at the top of the window 300. The rising air within the cavity 306 causes cooler air to be drawn from the room 304 into the airflow cavity 306 through an opening at the bottom of the cavity 306.

Airflow windows are most effective when installed on the south facade of a building because the increased incident solar radiation on the west and east facades can promote overheating of the window. On the other hand, an airflow window installed on the north facade may not receive enough incident solar radiation during the winter months to effectively temper air supplied to the building. Therefore, for most climates, airflow windows are limited to installation on the south facade.

The airflow window designs described above have several limitations. For instance, only the supply air mode offers the potential for improving indoor air quality by drawing fresh air from an outdoor space 102 into the room 104. Several limitations to the implementation of these airflow windows also arise from the design of their airflow cavities 106, 206, 306, and 406, which are open and as a result raise issues concerning security, acoustics, air quality, cleaning and maintenance, thermal comfort and/or condensation. For some building locations, conventional windows are useful to attenuate outdoor noise, whereas the airflow cavities 106, 206, 306, and 406 of the airflow windows 100, 200, 300, and 400 may provide a channel for outdoor noises to enter the indoor space 104, 204, 304, and 404, potentially causing acoustic problems. The ability to filter outdoor air before it enters a building in the supply air window 100 is important when considering indoor air quality. However, filters can hinder the effectiveness of natural ventilation. Airflow in the airflow cavities 106, 206, 306, and 406 of all airflow window modes can also promote the collection of dirt and dust on the interior surfaces of the window. Though offering the benefit of preheating air that enters a building during the day during the heating season, the supply air window 100 can contribute to heat losses during the night when the temperature of the inner pane 110 can drop, affecting the thermal comfort of the building occupants. Finally, condensation in an airflow window may occur if the surface temperature of a glazing layer falls below the dew point temperature of the air it contacts. Moisture can accumulate at the base of the window, which can lead to damage of the materials used to construct the window. Additionally, high outdoor humidity levels can increase the humidity indoors and decrease thermal comfort.

Other shortcomings of airflow windows are due to their added complexity as compared to a conventional window. The initial cost of purchasing an airflow window is likely higher, though strongly dependent on the type of airflow window and exact construction, as well as the availability of the product in relation to the building location. However, the use of airflow windows may reduce the size of the HVAC system required to heat and cool and building, providing a significant trade-off for the increased cost of an airflow window.

In view of the foregoing, though airflow window technology offers significant potential benefits including improved indoor air quality and reduced heating/cooling loads, current airflow windows have a number of limitations and as such further improvements in their construction and effectiveness would be desirable.

BRIEF SUMMARY OF THE INVENTION

The present invention provides airflow window systems capable of drawing fresh outdoor air into an indoor space to improve air quality within the indoor space, and also tempering the incoming outdoor air with outgoing indoor air, thus reducing the heating/cooling demands associated with introducing the outdoor air to the indoor space.

The airflow window system generally includes at least three glazing layers positioned roughly parallel to each other to define at least two internal airflow cavities within the airflow window system. A first of the glazing layers is adjacent a first of the two internal airflow cavities, a second of the glazing layers is adjacent a second of the two internal airflow cavities, and a center glazing layer is between the first and second glazing layers and separates the first and second internal airflow cavities. Airflow cavity openings are located adjacent the uppermost and lowermost extents of each airflow cavity, and airflow is enabled through the first internal airflow cavity between the openings thereof and enabled through the second internal airflow cavity between the openings thereof.

A significant advantage of this invention is the ability to employ the center glazing layer as a heat transfer medium between two air flows, one drawn from an outdoor space and supplied to an indoor space and the second drawn from the indoor space and exhausted to the outdoor space. In this manner, the window system operates as a crossflow heat exchanger capable of supplying fresh outdoor air to an enclosed indoor space, while reducing the thermal load resulting from the import of fresh air by thermally tempering the incoming fresh air with the outgoing indoor air.

Other objects and advantages of this invention will be better appreciated from the following detailed description.

DETAILED DESCRIPTION OF THE INVENTION

Figure 1:
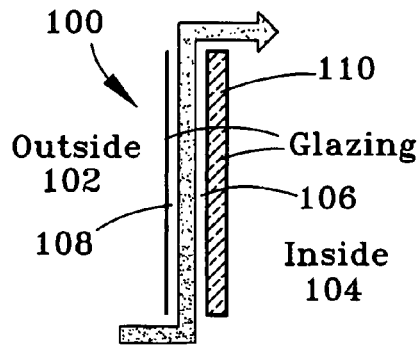
FIGS. 1 through 4 are schematic cross-sectional representations showing four modes of operation for prior art airflow windows: supply, exhaust, indoor air curtain, and outdoor air curtain, respectively.
Figure 2:
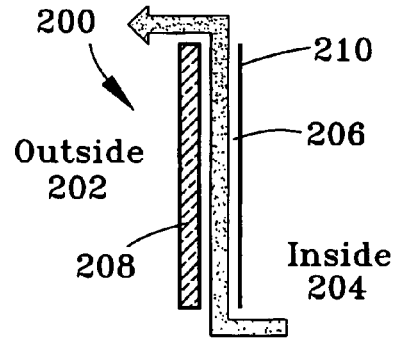
Figure 3:
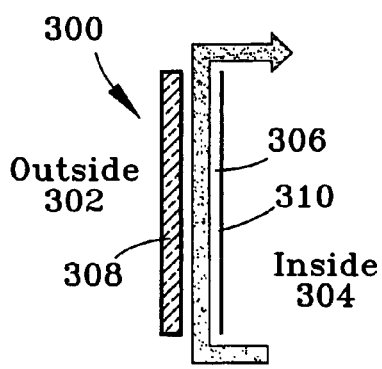
Figure 4:
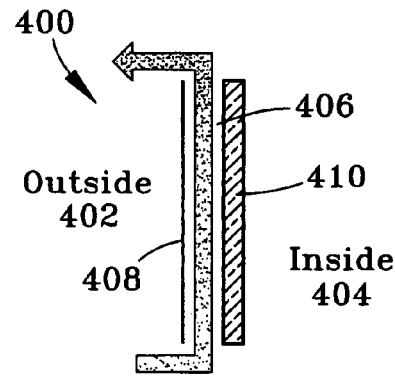
Figure 5:
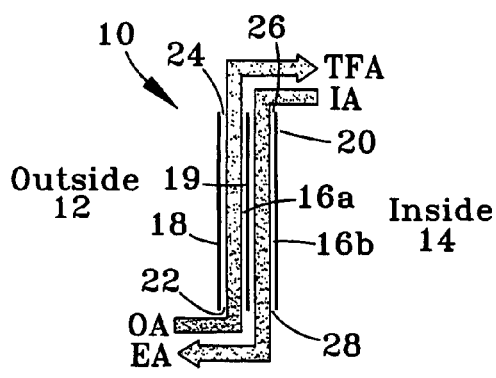
FIGS. 5 and 6 are schematic cross-sectional representations showing two modes of operation, supply and exhaust, respectively, for airflow windows in accordance with two embodiments of this invention.
Figure 6:
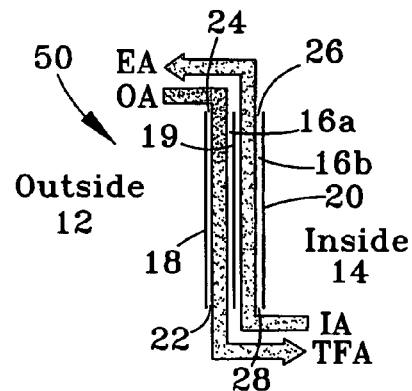

The present invention provides embodiments for an airflow window system that defines two separate airflow paths in an arrangement that has the potential for providing energy savings and improving indoor air quality within a building in which the window system is installed. Two embodiments are schematically represented in FIGS. 5 and 6. In each embodiment, the dual airflow path configuration is believed capable of offering benefits over the conventional airflow windows of FIGS. 1 through 4. In particular, the dual airflow path configuration has the advantage over the supply air window 100 (FIG. 1) of tempering incoming outdoor air with outgoing indoor air, thus reducing the heating/cooling demands associated with introducing outdoor air to an indoor space, and has the advantage over the exhaust air window 200 (FIG. 2) and air curtain windows 300 and 400 (FIGS. 3 and 4) by drawing fresh outdoor air into an indoor space, thus improving air quality of the indoor space.

The airflow window systems 10 and 50 of FIGS. 5 and 6 are shown as being a triple glazed unit, i.e., three glass layers or panes 18, 19, and 20, that define two parallel airflow cavities 16a and 16b through which air is allowed or forced to flow (because of the similar construction and sharing of basic components, identical reference numbers are used to identify the individual components of the window systems 10 and 50 in the Figures). The window systems 10 and 50 provide two different modes of operation, referred to as supply and exhaust, respectively. In the supply mode embodiment depicted in FIG. 5, outdoor air (OA) from an outdoor space 12 enters an opening 22 at the lower end of an outer airflow cavity 16a defined between the outer pane 18 and the center pane 19, flows upward through the cavity 16a, and is discharged as tempered fresh air (TFA) into an indoor space 14 by passing through an opening 24 at the upper end of the cavity 16a. Simultaneously, indoor air (IA) enters an opening 26 at the upper end of an inner airflow cavity 16b defined between the center pane 19 and the inner pane 20, flows downward through the cavity 16b, and is discharged as exhaust air (EA) into the outdoor space 12 by passing through an opening 28 at the lower end of the cavity 16b. In the exhaust mode embodiment depicted in FIG. 6, airflow directions through the airflow cavities 16a and 16b are reversed. Outdoor air (OA) from the outdoor space 12 enters through the opening 24, flows downward through the outer airflow cavity 16a, and is discharged through the opening 22 as tempered fresh air (TFA) into the indoor space 14, and indoor air (IA) simultaneously enters the opening 28, flows upward through the inner airflow cavity 16b, and is discharged through the opening 26 as exhaust air (EA) into the outdoor space 12.

In each embodiment, exhausted indoor air is used to temper incoming outdoor air, thus reducing heating/cooling demands of the indoor space 14 while providing fresh air to the indoor space 14. The exhausted indoor air flows through the inner airflow cavity 16b of each window system 10 and 50, so that the temperature of the inner pane 20 stabilizes relatively close to the air temperature within the indoor space 14 to promote the thermal comfort of occupants of the indoor space 14. Other operational aspects and efficiencies associated with these different modes will become apparent in the following discussion.

Figure 7:
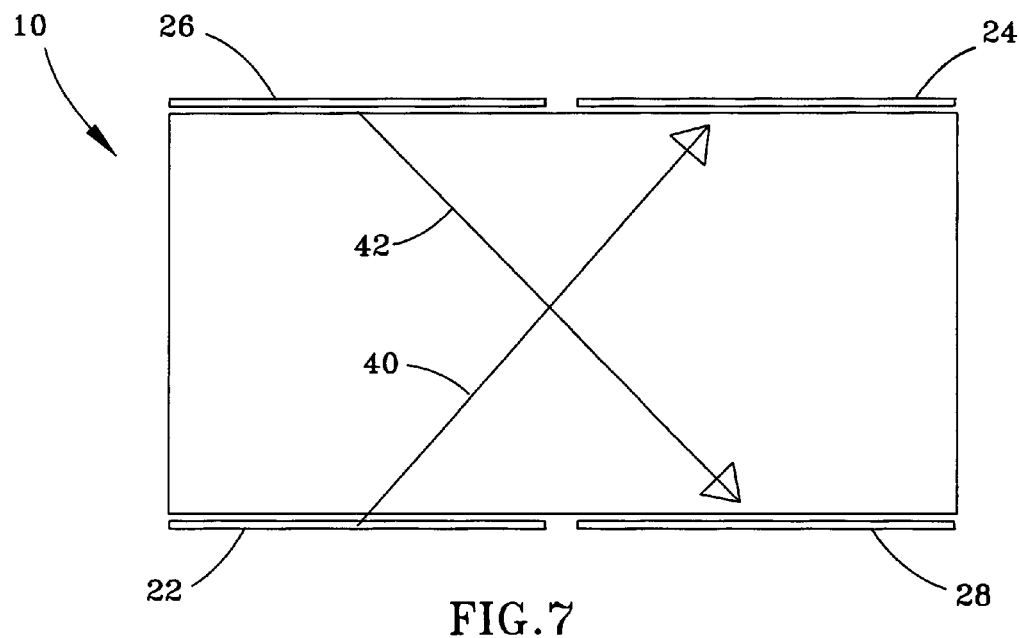
FIG. 7 schematically represents a frontal view of the airflow window of FIG. 5.

As can be seen from the airflow schematics in FIGS. 5 and 6, the openings through which air enters the window systems 10 and 50 (22 and 26 in FIG. 5; 24 and 28 in FIG. 6) are positioned adjacent the openings through which air exits the window systems 10 and 50 (24 and 28 in FIG. 5; 22 and 26 in FIG. 6). To reduce short-circuiting tempered fresh air (TFA) into the indoor air (IA) stream, the window systems 10 and 50 can be configured so that the width of the upper and lower extent of each window system 10 and 50 is divided (perhaps equally) between the openings serving as inlet and outlet, as represented in FIG. 7 for the supply mode embodiment of FIG. 5. Due to this positioning of the inlets/outlets in the supply mode of FIG. 5, airflow 40 through the outer airflow cavity 16a is generally diagonally upward from the opening 22 to the opening 24, and airflow 42 through the inner airflow cavity 16b is generally diagonally downward from the opening 26 to the opening 28 (flow directions are reversed for the exhaust mode of FIG. 6). With this configuration, each of the window systems 10 and 50 performs as a crossflow heat exchanger with solar energy recovery.

The performance of the window systems 10 and 50 were investigated both using computational methods (computational fluid dynamics, or CFD) and experiments to confirm the computational methods. The CFD simulations employed FLUENT®, a commercial CFD software program, to model convection, conduction, and radiation within the window systems 10 and 50. Because the window systems 10 and 50 are intended for use in residential buildings, the computational and experimental investigations were based on a window height of about 1.22 meters (about four feet) and a window width of about 0.92 meter (about three feet), which are within common ranges for residential window dimensions. The thickness of each pane 18, 19, and 20 was set at 3 mm. Because mixed-mode heat transfer is present in the window systems 10 and 50, the effects from conduction, convection and radiation must be considered when developing a window model. The following is an overview of the three main modes of heat transfer as they relate to the window systems 10 and 50.

Due to a temperature difference on either side of each glass pane 18, 19, and 20, conduction occurs through each pane 18, 19, and 20. Because conduction through the glass panes 18, 19, 20 is intended, a double-glazed insulated unit is not believed to be necessary or preferred for any of the panes 18, 19, and 20, particularly the center pane 19. To the contrary, conduction across the center pane 19 is desirable because of the intended heat exchanger effect between the air flows in the two airflow cavities 16a and 16b. As such, heat transfer between the two air flows can be improved to some extent by manufacturing the center pane 19 from a material having a relatively high thermal conductivity coefficient, for example, greater than the materials of the inner and outer panes 18 and 20. Notable highly conductive materials include metals such as aluminum alloy, pure copper, and pure silver with conductivities of about 170, 401 and 429 W/m², respectively. Disadvantages of metallic materials include poor transmittance of light and susceptibility to corrosion. Transparent/translucent materials such as polymers tend to be less conductive than glass, for example, acrylic, polycarbonate, and polyethylene have conductivities that range from about 0.13 to 0.30 W/m·K. Therefore, glass is believed to be preferred for the center pane 19, though it is within the scope of this invention that other materials could be used, especially transparent/translucent materials that are more thermally conductive than glass.

The linear temperature profile across each pane 18, 19, and 20 is small when compared to the more parabolic temperature profile due to convection. The resistance to conduction ($R_{cond}$) is defined as:

$$R_{cond} = L/kA$$

where L is the thickness of the pane 18, 19, or 20, k is the thermal conductivity of the pane material, and A is the surface area of the pane 18, 19, or 20 perpendicular to heat transfer. For a 3 mm thick glass pane with a conductivity of about 1.4 W/m·K, the resulting resistance to heat transfer is small. As a result, the temperature difference across each glass pane 18, 19, and 20 is relatively small. It was therefore assumed that the surface temperatures of each pane 18, 19, and 20 are the same across the thickness of the pane 18, 19, and 20 at each position for the computational simulations and experiments.

Figure 10:
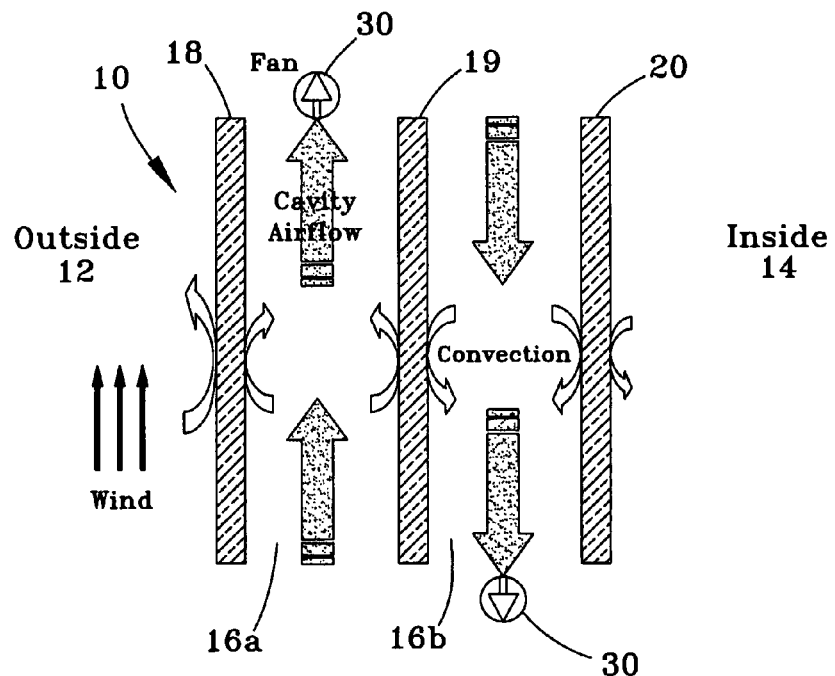
FIGS. 10 and 11 are overviews of the convection and radiation effects, respectively, on the airflow window of FIG. 5.

Convective heat transfer effects are present within and around the window systems 10 and 50 due to the airflow over the glass panes 18, 19, and 20, as represented in FIG. 10. Convection can be due to natural or forced effects. On the outer surface of the outer pane 18, wind is the main driving force. Therefore, windy and calm conditions should be considered. Per design conditions listed in the ASHRAE Fundamentals Handbook (2001), a windy condition indicates an outside air velocity of about 6.7 m/s, whereas calm conditions are similar to indoor airflows far from a diffuser, or about 0.2 to about 0.3 m/s. On the interior surfaces of the panes 18, 19, and 20, i.e., those defining the airflow cavities 16a and 16b, convective heat transfer effects are present as a result of natural convection as the air within the cavities 16a and 16b becomes more or less buoyant as a result of an increase or decrease in temperature, as the case may be. Natural convection within the cavities 16a and 16b has different influences on the performance of each window system 10 and 50 because of their different operating modes: supply and exhaust (FIGS. 5 and 6). Depending on the season, each configuration would align the airflow paths between the indoors/outdoors with the direction of dominant buoyancy forces. The supply mode (FIG. 5) would appear to be most effective during the heating season, when exhausted indoor air cools and sinks in the inner airflow cavity 16b, driving the air to the outdoor space 12, while cold outdoor air is heated and rises within the outer airflow cavity 16a, driving the air to the indoor space 14. Conversely, the exhaust mode (FIG. 6) would appear to be most useful during the cooling season, again because the airflow patterns within the window system 50 work with the naturally prevailing buoyancy forces.

Figures 8, 9:
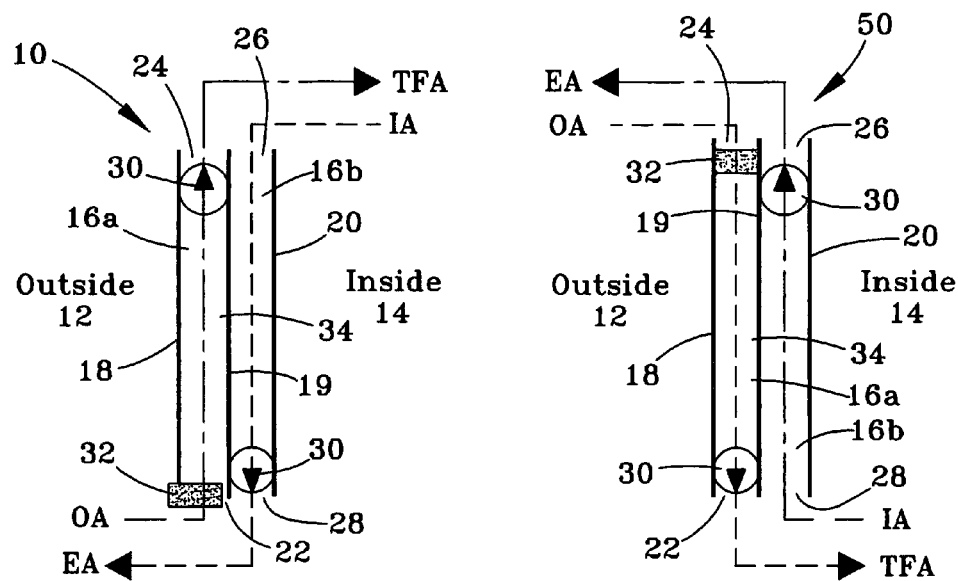
FIGS. 8 and 9 are schematic cross-sectional representations of the airflow windows of FIGS. 5 and 6 with optional features in accordance with additional embodiments of the invention.

FIG. 8 and 9 depict modified versions of the embodiments of FIGS. 5 and 6, in which the airflow through the cavities 16a and 16b is supplemented with fans 30, whose size and efficiencies can be selected to ensure that the indoor space 14 can be supplied with sufficient outdoor air, filtered through filters 32, to improve indoor air quality. For the following investigations, forced convection using fans was studied in detail. In part, the concern was that the experiments on test prototypes were to be conducted in an indoor test facility, and without exposure to solar radiation or a radiation source of the same intensity, buoyancy forces would be too small to accurately measure and airflow may be flowing in several directions at the inlets/outlets of the window system. Therefore, it was concluded that the validation of a CFD model by experimental measurements would only be possible if a mechanically ventilated (forced convection) window was evaluated. ASHRAE Standard 62.2-2004 specifies a minimum 10 L/s (20 cfm) per person of outdoor air in residential areas. For the investigations discussed below, flow rates of about 10 to about 20 L/s (about 20 to about 40 cfm) per window were evaluated, based on the premise of two occupants in a room with two windows.

Figure 11:
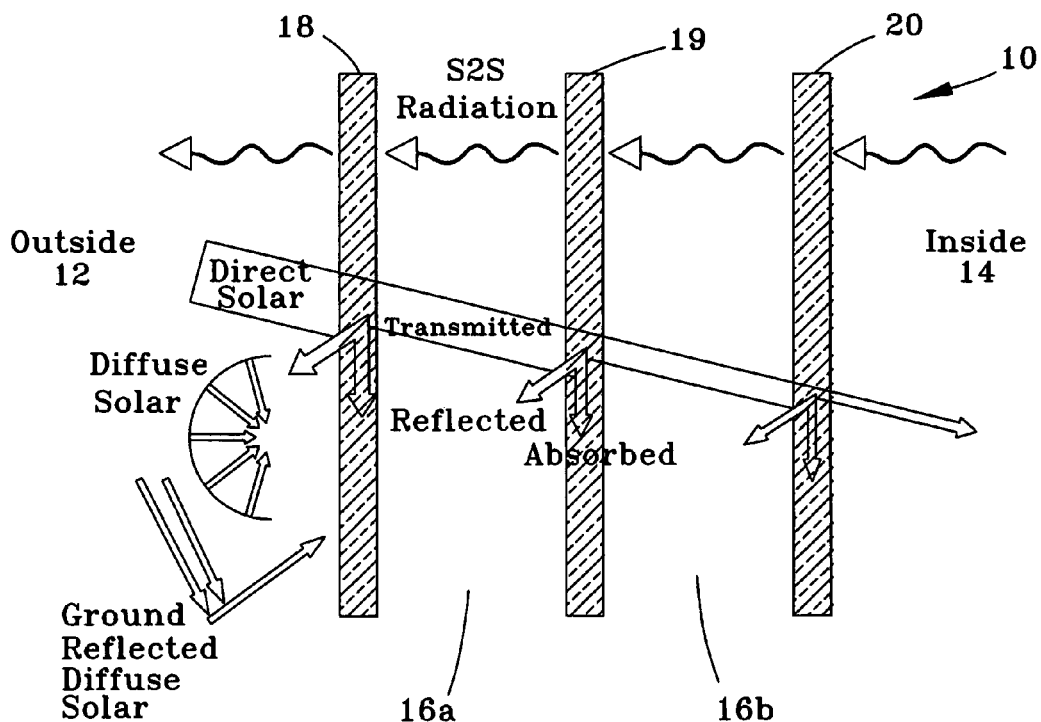

Three radiation interactions are present in the window systems 10 and 50: radiation to the indoor space 14, radiation between each pane 18, 19, and 20, and solar radiation as represented in FIG. 11. Each type of radiation plays a role in the performance of the window. The energy from solar radiation was estimated for each pane 18, 19, and 20 based on a survey of typical meteorological (TMY2) solar data and calculations from the FLUENT® solar load calculator were conducted for several locations in the United States. This data suggested about 1000 W/m² as a suitable approximation for the average solar radiation flux during a sunny day, with about 800 W/m² as direct radiation and about 200 W/m² from atmospheric diffusive radiation and ground reflection. Likewise, a cloudy day was estimated to provide no direct radiation, but 200 W/m² diffusive radiation. The absorptivity of each pane 18, 19, and 20 was estimated using data from the ASHRAE Fundamentals Handbook (2001) for a clear-clear-clear triple glazing unit. In general, about 12% of solar radiation was estimated as being absorbed by the outer pane 18, about 8% by the middle pane 19, and about 5% by the inner pane 20. At solar noon on a vertical south facade, the actual incident solar radiation is dependent on the angle of the sun. For winter computations, the sun angle was presumed to be about 35° from horizontal, and for summer computations this angle was presumed to be about 75° from horizontal. From these angles, the solar radiation flux values were adjusted accordingly. During sunny days in the winter and summer, incident radiation was estimated to be about 820 and about 260 W/m², respectively.

FIGS. 8 and 9 further show the window systems 10 and 50 equipped with optional louvers 34 located in their outer airflow cavities 16a. The louvers 34 can promote the absorption of solar radiation, and are therefore of interest to the invention. If configured to be rotated, the louvers 34 can also be used to effectively obstruct the flow of airflow through the airflow cavity 16a. While within the scope of the present invention, the presence and possible effect of the louvers 34 was not included in the simulations and experimental investigations.

Taking into consideration the above factors, CFD simulations were performed based on the configurations of the window systems 10 and 50 described above. The summer indoor and outdoor temperatures used for the simulations were 24° C. and 37° C., respectively, and the winter indoor and outdoor temperatures used for the simulations were 22° C. and 2° C., respectively. Due to their complexity, the CFD simulations will not be described in any detail here, other than to report that the results provided numerous temperature data for each panel 18, 19, and 20 and for each opening 22, 24, 26, and 28 under steady-state conditions, and that these results suggested that significant benefits could be obtained with the window systems of FIGS. 5 and 6. Therefore, validation of the simulation data was pursued with experimental testing of actual hardware.

The experimental investigations obtained flow and temperature data with a full-scale airflow window installed in an environmental chamber facility. A preliminary investigation was performed for the forced convection supply mode (FIG. 8) under winter and summer conditions with no solar radiation. As with the CFD simulations, the glazing area was about 1.22 meters high and about 0.92 meter wide. The multiple layer construction of the window system was formed using double strength, clear glass panes with a thickness of about 3 mm. Nine thermocouples were glued on one surface of each pane for a total of twenty-seven surface temperature readings. Each of the two airflow inlets and two airflow outlets of the window system (corresponding to openings 22 and 26 and openings 24 and 28, respectively, in FIGS. 5, 7, and 8) was monitored with three thermocouples for inlet/outlet airflow temperature measurements, for a total of twelve airflow temperature readings.

The preliminary investigation was conducted for four different scenarios: winter and summer conditions with forced airflow through the airflow cavities of about 10 or about 15 L/s. Results from these experiments were found to be in good agreement with the data from the CFD simulation of the supply-mode window system. Therefore, it was concluded that the CFD simulations were of sufficient accuracy to conduct parametric studies to identify optimal values for several parameters of the window systems 10 and 50. The parameters considered were the mode of operation (supply and exhaust), solar radiation, wind, airflow rate, and cavity width over winter and summer conditions.

An optimal airflow window configuration would be expected to depend on the mode of operation and weather conditions. For example, it was conjectured that the supply mode (FIGS. 5, 7, and 8) may be most effective during winter months, while the exhaust mode (FIGS. 6 and 9) may be most effective during summer months. Such configurations may make use of natural buoyancy effects to drive airflow in the window cavities, allowing for fan energy consumption to be reduced. However, for reasons previously discussed, the investigation focused on using a fan to drive the airflows through the airflow cavities. Other than where noted, the same parameters used in the original CFD simulations were used in the parametric studies.

Figure 12:
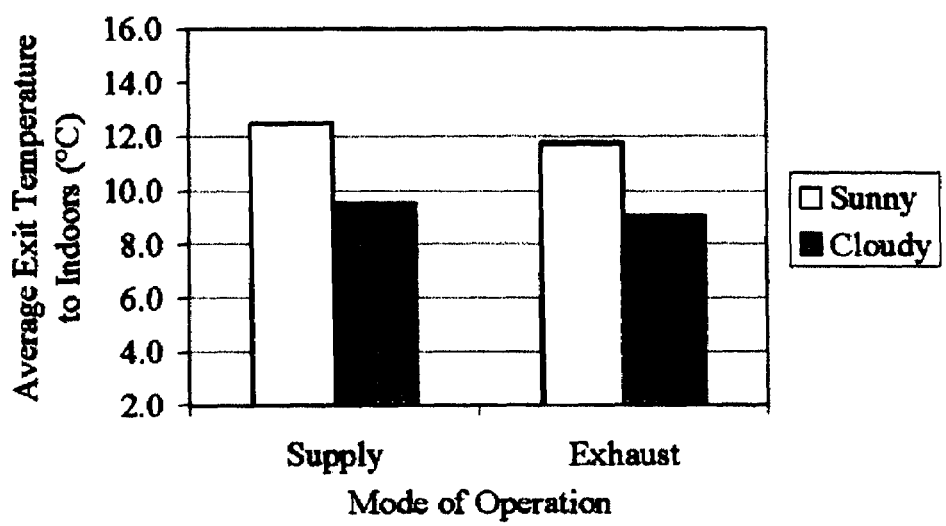
FIGS. 12 and 13 are graphs plotting data obtained from simulations to assess the performance of airflow windows with the supply and exhaust operating modes represented in FIGS. 5 and 6, respectively.
Figure 13:
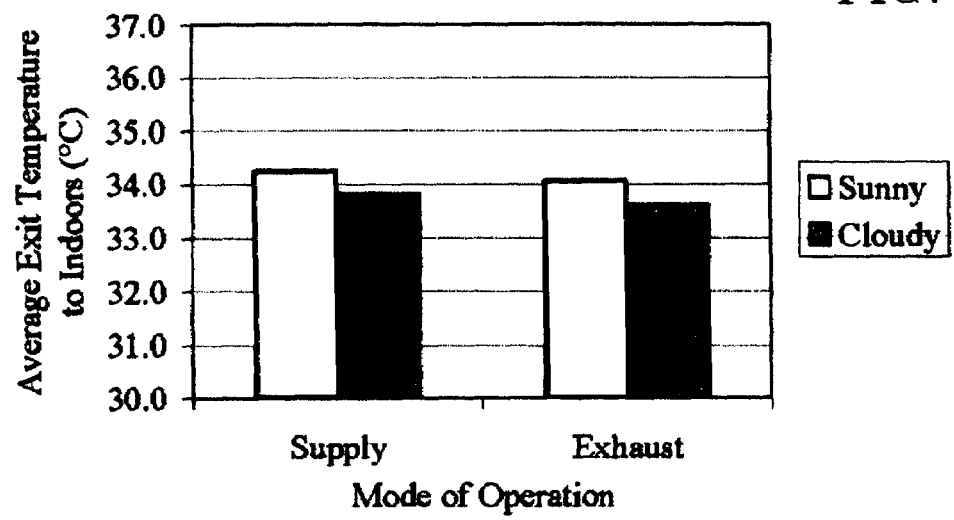

FIGS. 12 and 13 are graphs generated from a CFD simulation showing the effect that the particular mode (supply and exhaust) has on the exit temperature of the tempered fresh air supplied by the window system 10/50 to the indoor space. Results are presented for each window system 10 and 50 under summer and winter conditions and sunny and cloudy sky conditions, using a forced airflow rate of 10 L/s and a cavity width of 12 mm. The most desirable mode of operation would provide the highest exit temperature to the indoors during the winter and the lowest exit temperature to the indoors during the summer. For a flowrate of 10 L/s, the supply mode was slightly better during the winter and the exhaust mode slightly better during the summer. However, this difference was only about 1° C. or less, indicating that the mode of operation is not likely critical under the evaluated conditions using fan-driven airflow.

A subsequent simulation with the airflow rate increased from 10 L/s to 20 L/s indicated that the performance from the supply and exhaust modes would be nearly identical. An increase in forced airflow rate is indicative of a decreased ratio of natural convection to forced convection. Because the mode of operation appeared to become less important with increasing airflow rates, it was decided that only the supply mode (the window system 10 of FIGS. 5, 7, and 8) would be evaluated with subsequent simulations.

Figure 14:
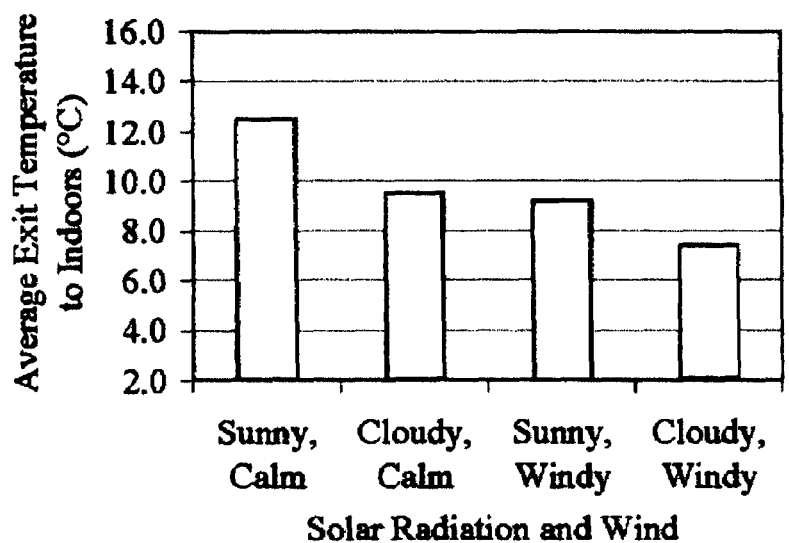
FIGS. 14 and 15 are graphs plotting data obtained from simulations to assess the winter and summer performance of the supply-mode airflow window of FIG. 5 under varying solar radiation conditions.
Figure 15:
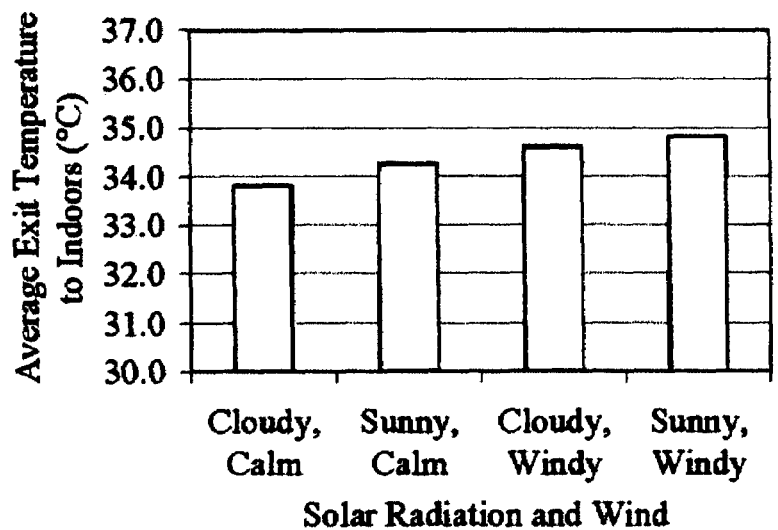
Figure 16:
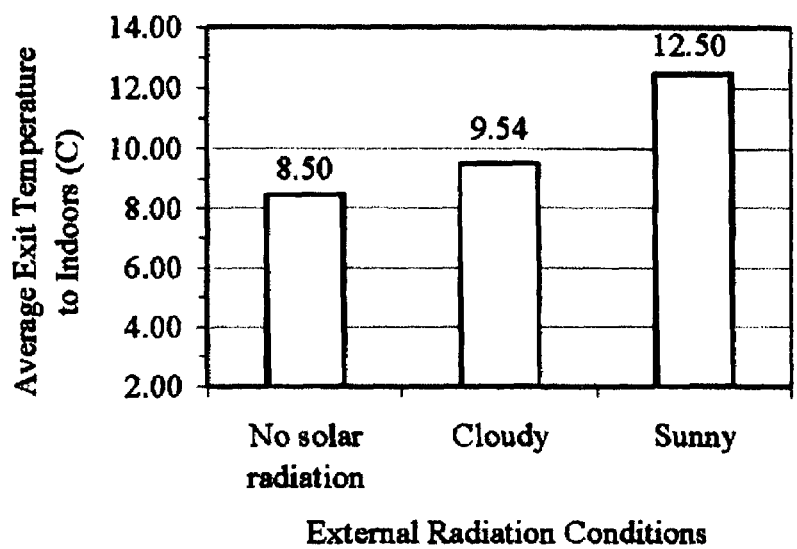
FIGS. 16 and 17 are graphs plotting data obtained from simulations to assess the winter and summer performance of the supply-mode airflow window of FIG. 5 under varying combinations of solar radiation and wind conditions.
Figure 17:
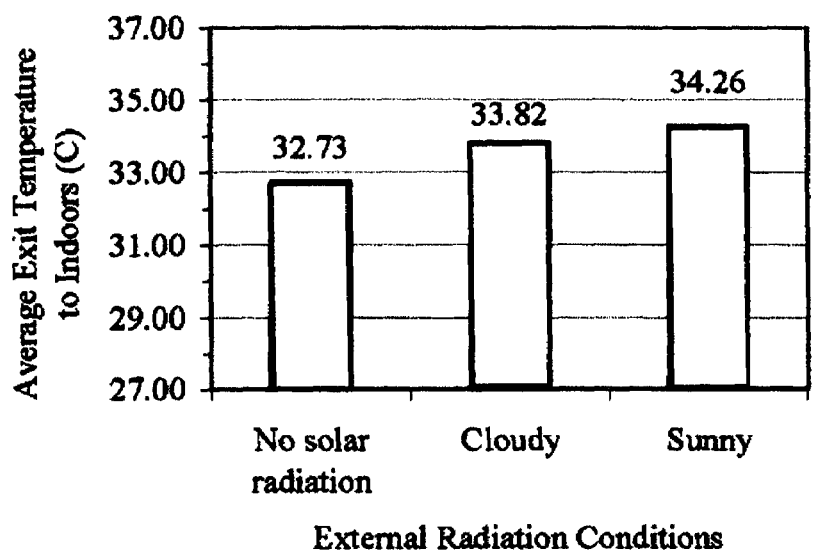

Next, the effects of solar radiation and wind were investigated with CFD simulations. FIGS. 14 and 15 show exit temperatures to the indoor space for four combinations of solar radiation and wind under winter and summer conditions, respectively, and FIGS. 16 and 17 show exit temperatures to the indoor space for three solar radiation conditions in winter and summer, respectively. As before, the simulation used an airflow rate of 10 L/s and a cavity width of 12 mm. During winter conditions, the exit temperature to the indoors was the highest under sunny and calm conditions. On the other hand, during summer conditions, the exit temperature to the indoors was the lowest under cloudy and calm conditions. Given the desired effect on exit temperature, these conditions provided the best performance for each season. Results indicated that solar radiation is desirable during the winter (heating) season and less desirable during the summer (cooling). Calm wind conditions were favorable for promoting less convective heat losses during the winter and less convective heat gains during the summer.

Figure 18:
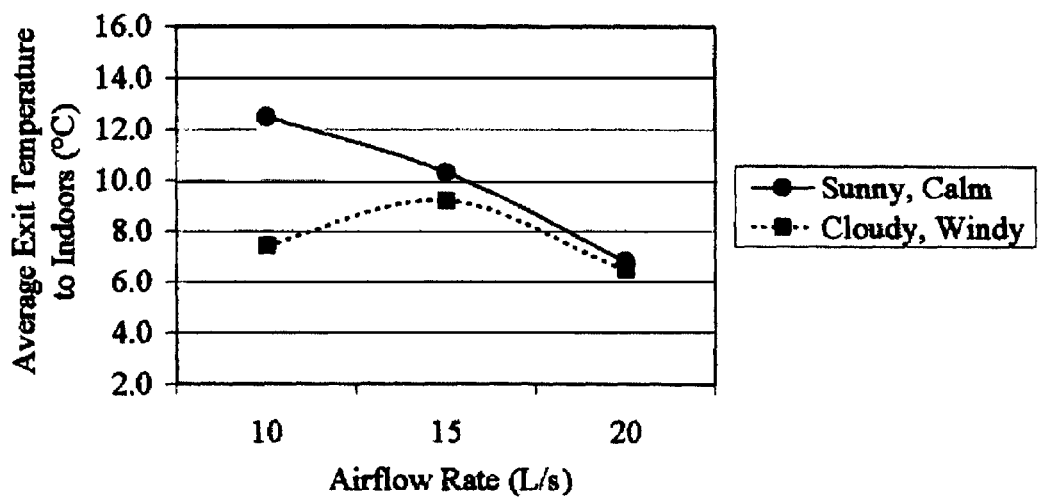
FIGS. 18 and 19 are graphs plotting data obtained from simulations to assess the winter and summer performance of the supply-mode airflow window of FIG. 5 at different airflow rates.
Figure 19:
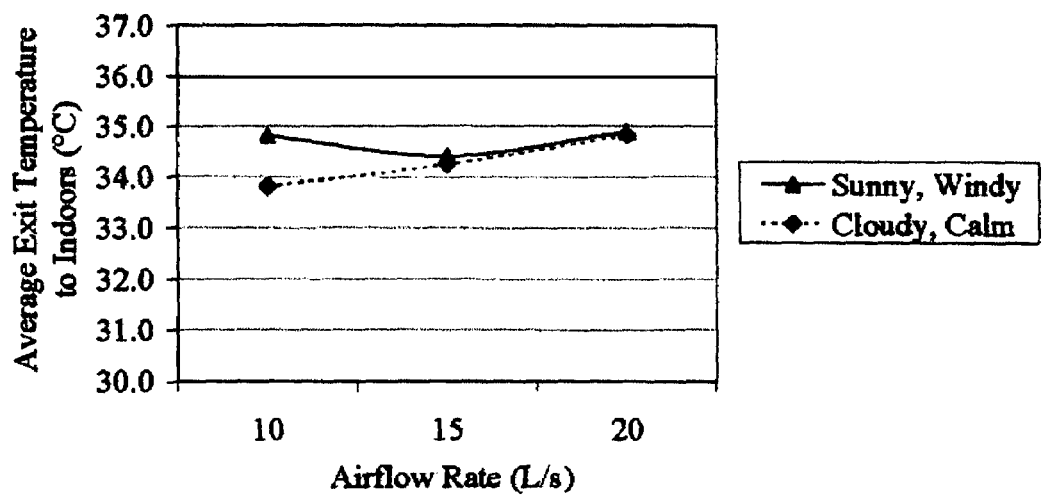

CFD simulations were then conducted to evaluate the effect of airflow rate within the airflow cavities 16a and 16b. FIGS. 18 and 19 show the simulated results of airflow rate on the exit temperature during winter conditions and summer conditions, respectively. Note that the most and least desirable solar radiation and wind combinations are highlighted for each season. Again, the simulation used a cavity width of 12 mm, while the evaluated airflow rates were 10, 15, and 20 L/s. The effect of airflow rate on exit temperature can be seen to vary significantly between winter and summer conditions. During sunny, winter conditions, the largest increase in exit temperature to the indoors was achieved with the lowest flow rate. The trends also seem to indicate that the decrease in window performance with an increase in flow rate is not linear, and that window performance is most sensitive to changes at lower flow rates. However, under summer and cloudy winter conditions, flow rate appears to have little if any effect on exit temperature to the indoor space. This may have been due to the relatively small incident solar radiation simulated for sunny summer days and cloudy or sunny winter days.

Figure 20:
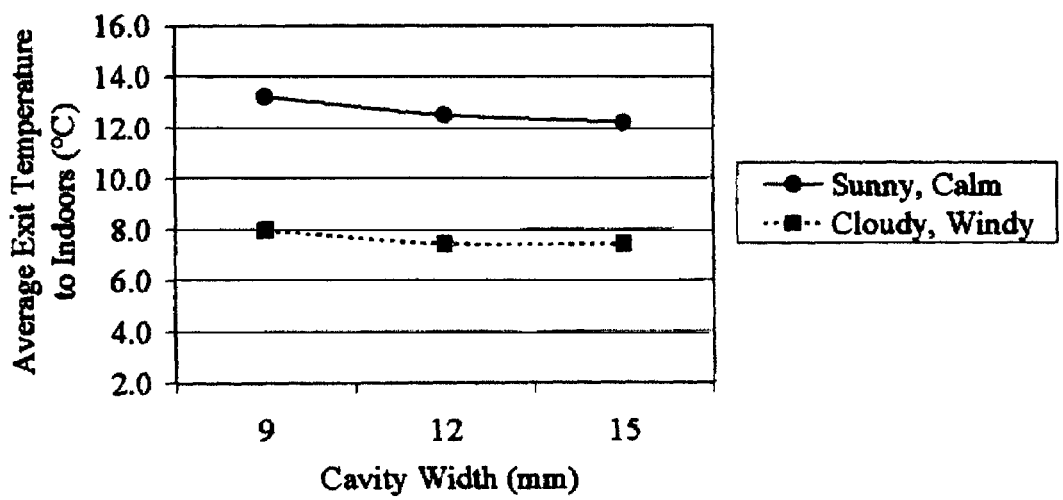
FIGS. 20 and 21 are graphs plotting data obtained from simulations to assess the winter and summer performance of the supply-mode airflow window of FIG. 5 for different airflow cavity widths.
Figure 21:
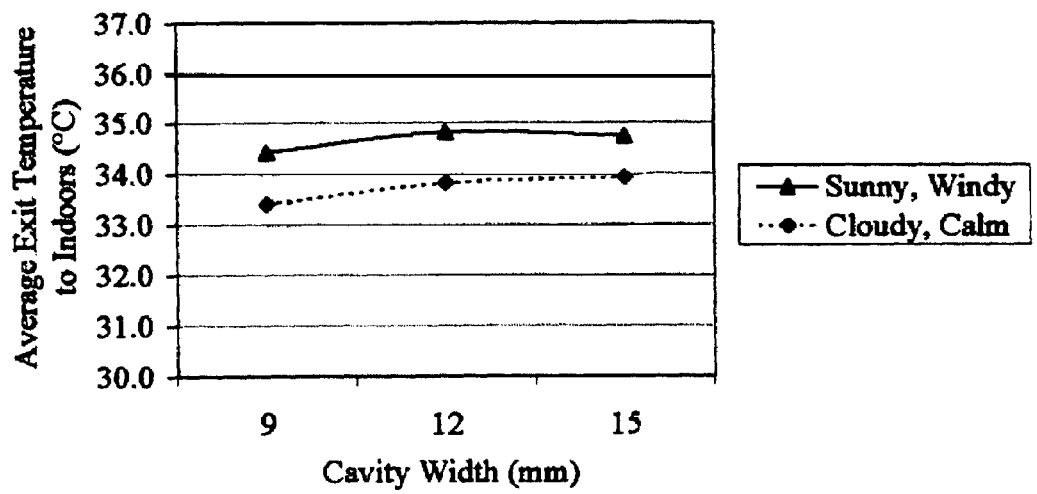

Finally, FIGS. 20 and 21 represent the data obtained from CFD simulations conducted to evaluate the effect of the width of the airflow cavities 16a and 16b. Airflow rates for the simulation were again 10 L/s. Overall, it was found that smaller cavity widths improved window performance. Unlike airflow rate, cavity width appeared to have a small impact on exit temperature under winter conditions. The impact of cavity width on exit temperature for both winter and summer was about 1° C. for cavity widths over a range of 9 to 15 mm. The efficiency of the heat exchange between the two cavities 16a and 16b of the window system 10 and energy reclamation was used to measure the window performance for each of the parameters studied.

Heat recovery efficiency values were assessed for the combination of parameters suggested as being optimal under the simulated conditions discussed above. As set forth in the equation below, heat recovery efficiency ($\epsilon$) can be calculated by taking the absolute value of the ratio between the actual temperature change of the air in the inner cavity to the maximum temperature difference between the outdoor and indoor air temperatures.

$$\epsilon = |(T_{out} - T_{o,i})/(T_{out} - T_{in})|$$

In the equation, $T_{out}$ is the outdoor temperature, $T_{in}$ is the indoor temperature, and $T_{o,i}$ is the average exit temperature to the indoors.

Heat recovery efficiency was found to be greatest when the flow rate and cavity width are the smallest values evaluated, 10 L/s and 9 mm, respectively. During winter conditions, performance was maximized under sunny and calm weather conditions with an efficiency of 80.5%. During summer conditions, performance was maximized under cloudy and calm weather conditions with an efficiency of 23.7%. Using the same flow rate and cavity width values, the lowest heat recovery efficiencies were also calculated. During winter conditions, the lowest efficiency calculated was 34.1%, and occurred under cloudy and windy conditions. Under summer conditions, the lowest calculated efficiency was 14.7%, which occurred during sunny and windy conditions.

From the above it was concluded that each of the airflow window systems 10 and 50 represented in FIGS. 5 through 9 offer great potential for conserving energy and improving indoor air quality. Forced or natural convection airflow can be used to temper outdoor air with exhausted indoor air, thus reducing heating/cooling demands associated with providing fresh air to an indoor space year round. The window systems 10 and 50 conserve energy by operating as a cross-counter-flow heat exchanger utilizing solar energy trapped by the panes 18, 19, and 20 of the window systems 10 and 50. Supply air temperatures and inner pane temperatures were closer to the indoor space temperature under all weather conditions studied, thus promoting the thermal comfort of occupants of the indoor space.

Figure 22:
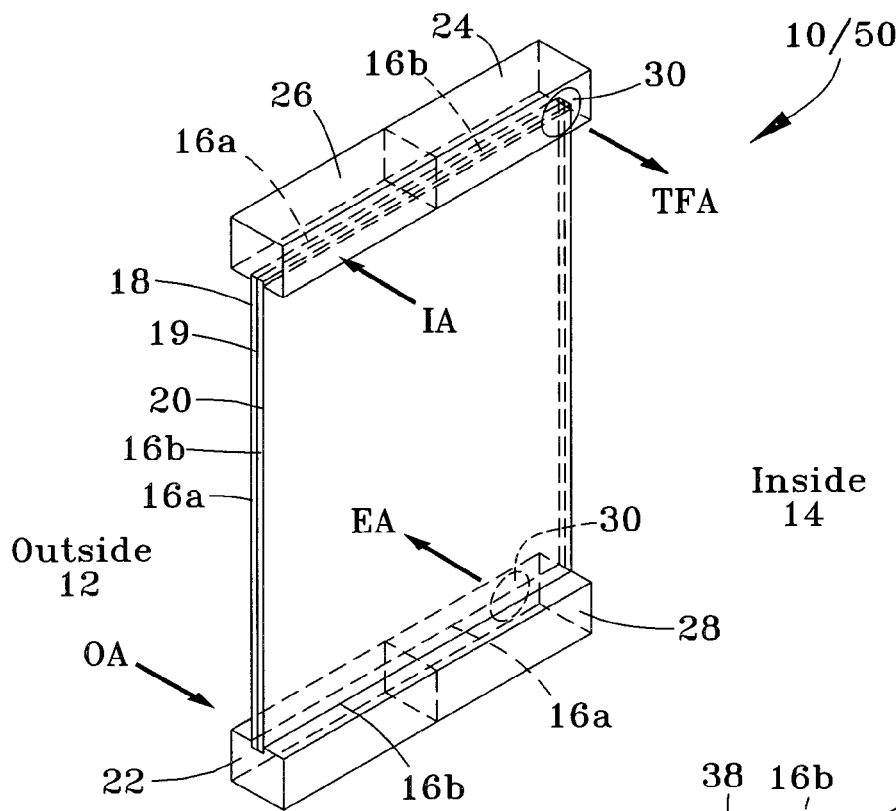
FIGS. 22 and 23 schematically represent perspective views of the airflow windows of FIGS. 5 and 6 with optional features in accordance with additional embodiments of the invention.
Figure 23:
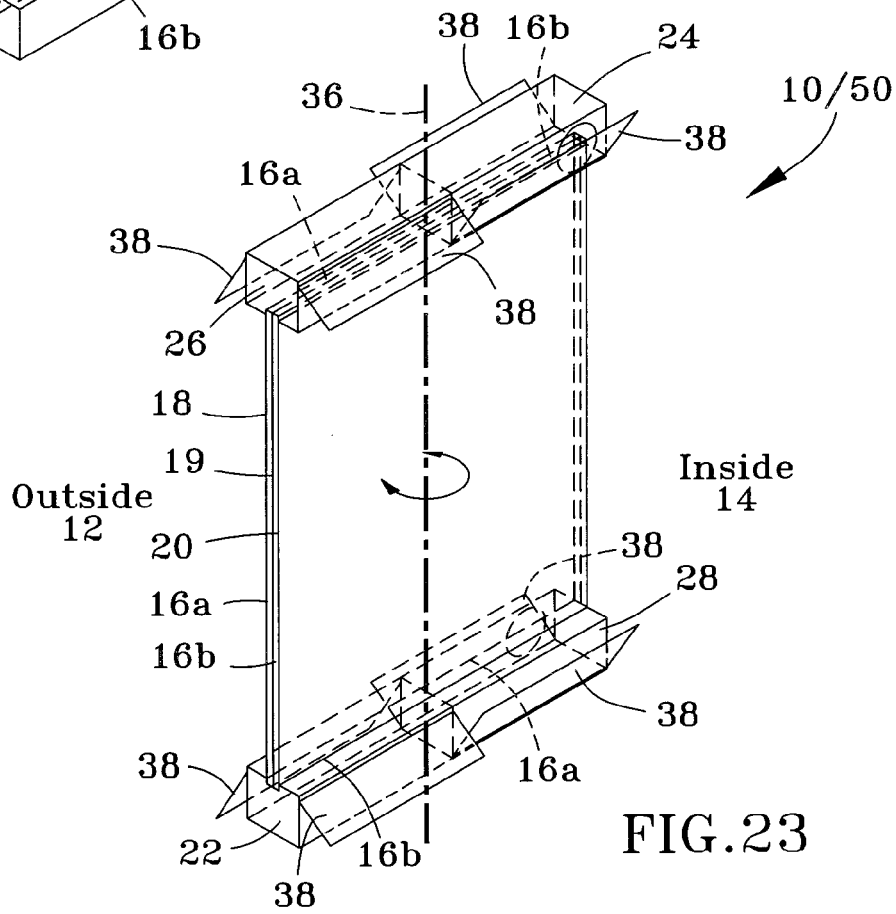

Two implementations for the window system 10 of FIGS. 5, 7, and 8 are shown in perspective in FIGS. 22 and 23 (the same implementations are also applicable to the window system 50 of FIGS. 6 and 9). In FIGS. 22 and 23, the openings 22, 24, 26, and 28 are in the form of plenums located and fluidically connected to the appropriate airflow cavity 16a or 16b. FIG. 22 shows fans 30 within the openings 28 and 24 to the airflow cavities 16a and 16b, respectively, for the purpose of providing mechanical (forced) ventilation through the airflow cavities 16a and 16b. Due to the symmetry of the supply and exhaust air window configurations (for example, compare FIGS. 5 and 6), the supply and exhaust modes of operation can be interchanged by rotating the window system 10 about its central vertical axis 36, as represented in FIG. 23. FIG. 23 also shows the openings 22, 24, 26, and 28 equipped with doors 38 that can be opened and closed, depending on the rotational orientation of the window system 10 and its operating mode (supply or exhaust). When open, the doors 38 can also serve as deflectors to promote natural ventilation and separation of air entering and leaving the window system 10.

While the invention has been described in terms of specific embodiments, it is apparent that other forms could be adopted by one skilled in the art. For example, the physical configuration of the window systems 10 and 50 could differ from that shown, materials and processes other than those noted could be used, and more than two airflow cavities 16a and 16b could be provided. Therefore, the scope of the invention is to be limited only by the following claims.

The invention claimed is:

1. An airflow window system adapted for vertical installation in a structure having an indoor space and surrounded by an outdoor space, the airflow window system comprising:

at least three glazing layers positioned roughly parallel to each other to define at least inner and outer airflow cavities within the airflow window system, the inner airflow cavity being closer to the indoor space than the outer airflow cavity, a first glazing layer of the three glazing layer being an outer glazing layer adjacent the outer airflow cavity and adapted for installation adjacent the outdoor space, a second glazing layer of the three glazing layers being an inner glazing layer adjacent the inner airflow cavity and adapted for installation adjacent the indoor space, and a center glazing layer of the three glazing layers being between the inner and outer glazing layers and separating the inner and outer airflow cavities;

airflow cavity openings adjacent uppermost and lowermost extents of each of the inner and outer airflow cavities; and means for enabling airflow from the indoor space through the inner airflow cavity between the airflow cavity openings thereof and for simultaneously enabling airflow from the outdoor space through the outer airflow cavity between the airflow cavity openings thereof;

wherein the airflow window system is adapted to operate in a supply mode in which air from the indoor space flows downward through the inner airflow cavity and air from the indoor space flows upward through the outer airflow cavity, and is also adapted to operate in an exhaust mode in which air from the indoor space flows upward through the inner airflow cavity and air from the outdoor space flows downward through the outer airflow cavity;

wherein the airflow through the inner airflow cavity acts to stabilize a temperature of the inner glazing layer at a temperature closer to an indoor air temperature than an outdoor air temperature.

2. The airflow window system according to claim 1, wherein the center glazing layer is not a double-glazed insulated unit.

3. The airflow window system according to claim 1, wherein the center glazing layer is more thermally conductive than the inner and outer glazing layers.

4. The airflow window system according to claim 1, wherein the airflow enabling means comprises doors located at the airflow cavity openings of the inner and outer airflow cavities.

5. The airflow window system according to claim 1, wherein the airflow enabling means does not comprise a fan and relies solely on natural convection within the inner and outer airflow cavities.

6. The airflow window system according to claim 1, wherein the airflow enabling means comprises a fan located at at least one of the airflow cavity openings of the inner and outer airflow cavities.

7. The airflow window system according to claim 6, wherein the fan forces air through the at least one of the airflow cavity openings at a rate of about 15 liters/second or less.

8. The airflow window system according to claim 6, wherein the fan forces air through the at least one of the airflow cavity openings at a rate of about 10 liters/second or less.

9. The airflow window system according to claim 1, wherein each of the inner and outer airflow cavities has a width transverse to the airflow therethrough of about 15 millimeters or less.

10. The airflow window system according to claim 1, wherein each of the inner and outer airflow cavities has a width transverse to the airflow therethrough of about 12 millimeters or less.

11. The airflow window system according to claim 1, wherein the airflow window system has oppositely-disposed first and second lateral extents, a first airflow cavity opening of the airflow cavity openings is at the lowermost extent of the outer airflow cavity and adjacent the first lateral extent, a second airflow cavity opening of the airflow cavity openings is at the uppermost extent of the outer airflow cavity and adjacent the second lateral extent, a third airflow cavity opening of the airflow cavity openings is at the uppermost extent of the inner airflow cavity and adjacent the first lateral extent, and a fourth airflow cavity opening of the airflow cavity openings is at the lowermost extent of the inner airflow cavity and adjacent the second lateral extent.

12. The airflow window system according to claim 11, wherein the airflow through the outer airflow cavity is generally diagonal between the first and second airflow cavity openings, and the airflow through the inner airflow cavity is generally diagonal between the third and fourth airflow cavity openings.

13. The airflow window system according to claim 12, wherein the airflow through the outer airflow cavity is generally diagonally upward from the inner airflow cavity opening to the second airflow cavity opening, and the airflow through the inner airflow cavity is generally diagonally downward from the third airflow cavity opening to the fourth airflow cavity opening.

14. The airflow window system according to claim 12, wherein the airflow through the outer airflow cavity is generally diagonally downward from the second airflow cavity opening to the first airflow cavity opening, and the airflow through the inner airflow cavity is generally diagonally upward from the fourth airflow cavity opening to the third airflow cavity opening.

15. The airflow window system according to claim 1, wherein the airflow window system is configured to be rotatble about a central vertical axis thereof.

16. The airflow window system according to claim 1, further comprising louvers within the outer airflow cavity.

17. An airflow window system installed to have a vertical orientation in a structure having an indoor space and surrounded by an outdoor space, the airflow window system comprising:
    inner, center, and outer window panes positioned roughly parallel to each other to define inner and outer airflow cavities within the airflow window system, the outer window pane being between the outdoor space and the outer airflow cavity, the inner window pane being between the indoor space and the inner airflow cavity, and the center window pane being between the inner and outer window panes and separating the inner and outer airflow cavities;
    first and second airflow cavity openings adjacent, respectively, uppermost and lowermost extents of the outer airflow cavity;
    third and fourth airflow cavity openings adjacent, respectively, uppermost and lowermost extents of the inner airflow cavity; and
    means for enabling the airflow window system to operate in a supply mode in which airflow occurs from the outdoor space to the indoor space by entering through the second airflow cavity opening, flowing generally diagonally upward through the outer airflow cavity, and exiting through the first airflow cavity opening, and airflow occurs from the indoor space to the outdoor space by entering through the third airflow cavity opening, flowing generally diagonally downward through the inner airflow cavity, and exiting through the fourth airflow cavity opening;
    wherein the airflow through the inner airflow cavity acts to stabilize a temperature of the inner window pane at a temperature closer to an indoor air temperature than an outdoor air temperature.

18. The airflow window system according to claim 17, wherein the airflow enabling means comprises a fan and/or doors located at the airflow cavity openings of the inner and outer airflow cavities.

19. An airflow window system installed to have a vertical orientation in a structure having an indoor space and surrounded by an outdoor space, the airflow window system comprising:
    inner, center, and outer window panes positioned roughly parallel to each other to define inner and outer airflow cavities within the airflow window system, the outer window pane being between the outdoor space and the outer airflow cavity, the inner window pane being between the indoor space and the inner airflow cavity, and the center window pane being between the inner and outer window panes and separating the inner and outer airflow cavities;
    first and second airflow cavity openings adjacent, respectively, uppermost and lowermost extents of the outer airflow cavity;
    third and fourth airflow cavity openings adjacent, respectively, uppermost and lowermost extents of the inner airflow cavity; and
    means for enabling the airflow window system to operate in an exhaust mode in which airflow occurs from the outdoor space to the indoor space by entering through the first airflow cavity opening, flowing generally diagonally downward through the outer airflow cavity, and exiting through the second airflow cavity opening, and airflow occurs from the indoor space to the outdoor space by entering through the fourth airflow cavity opening, flowing generally diagonally upward through the inner airflow cavity, and exiting through the third airflow cavity opening;
    wherein the airflow through the inner airflow cavity acts to stabilize a temperature of the inner window pane at a temperature closer to an indoor air temperature than an outdoor air temperature.

20. The airflow window system according to claim 19, wherein the airflow enabling means comprises a fan and/or doors located at the airflow cavity openings of the inner and outer airflow cavities.

* * * * *